Nov. 26, 1946.  C. C. COHEN  2,411,614
TOY
Filed March 3, 1945  2 Sheets-Sheet 1
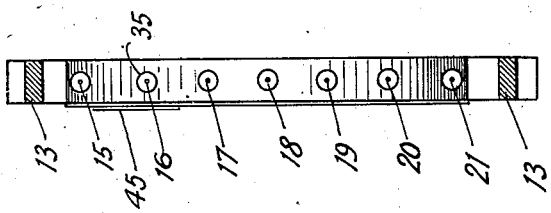
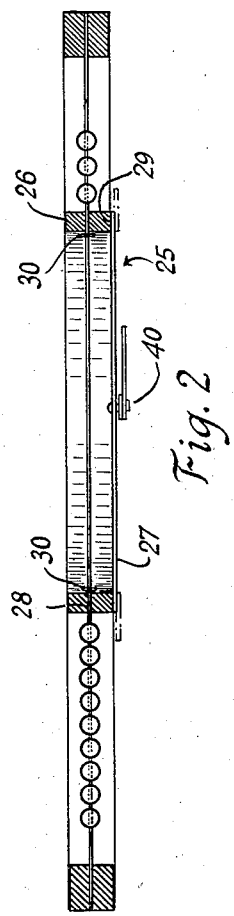
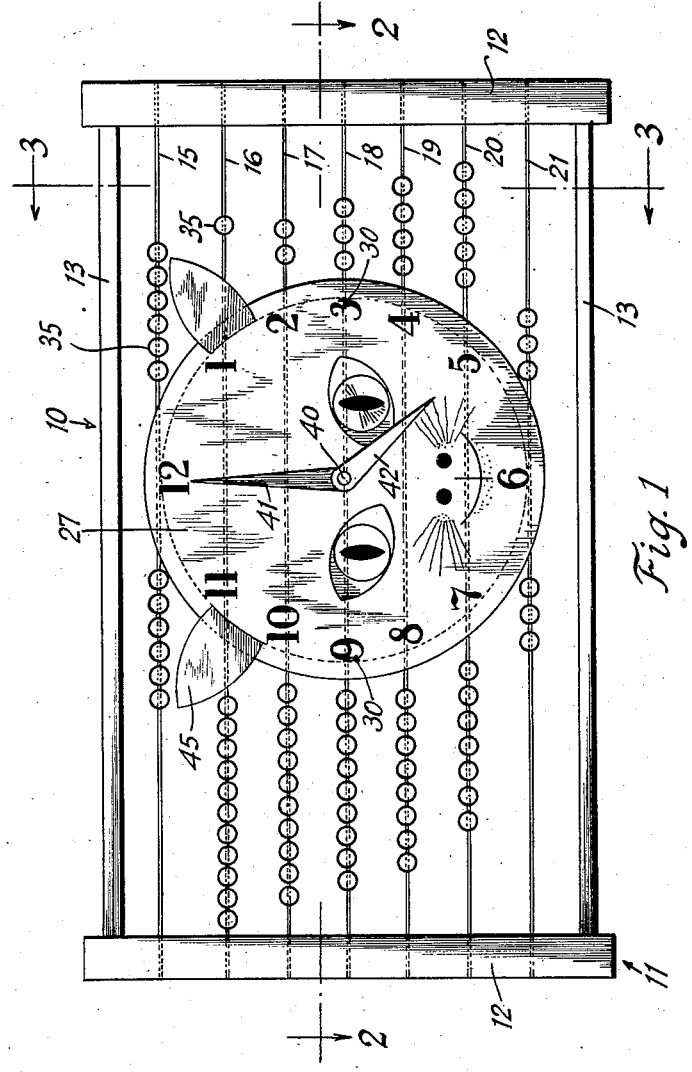
INVENTOR
*Charles C. Cohen*
BY
*J. B. Felshin*
ATTORNEY Nov. 26, 1946.     C. C. COHEN     2,411,614
TOY
Filed March 3, 1945     2 Sheets-Sheet 2

INVENTOR
Charles C. Cohen
BY
J. B. Felshin
ATTORNEY

Patented Nov. 26, 1946

2,411,614

UNITED STATES PATENT OFFICE 2,411,614

TOY

Charles C. Cohen, New York, N. Y.

Application March 3, 1945, Serial No. 580,876

6 Claims. (Cl. 35—39)

This invention relates to toys. It is particularly directed to an educational toy or game to aid a child in learning how to tell time, and also at the same time to aid a child in learning to count.

An object of this invention is to provide an amusing and educational device of the character described, comprising a clock face and wires emanating from points in the clock face adjacent the hour indications, and beads slidable on the wires, the number of beads on the wires corresponding to the hour indications on the clock face adjacent the respective wires.

Another object of this invention is to provide a device of the character described, comprising a frame carrying a plurality of parallel wires, a clock face mounted on the wires and between the ends of the frame, and beads strung on the wires, the number of beads on each wire corresponding to the hour indicated on the clock face and adjacent the wire.

Yet another object of this invention is to provide a strong, durable, compact and attractive toy of the character described which shall be relatively inexpensive to manufacture, easy to manipulate, amusing and educational in use, and yet practical and efficient to a high degree.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

In the accompanying drawings, in which is shown one of the various possible illustrative embodiments of this invention:

Fig. 1 is a top plan view of a device embodying the invention;

Fig. 2 is a cross-sectional view taken on line 2—2 of Fig. 1;

Fig. 3 is a cross-sectional view taken on line 3—3 of Fig. 1; and

Figure 4:
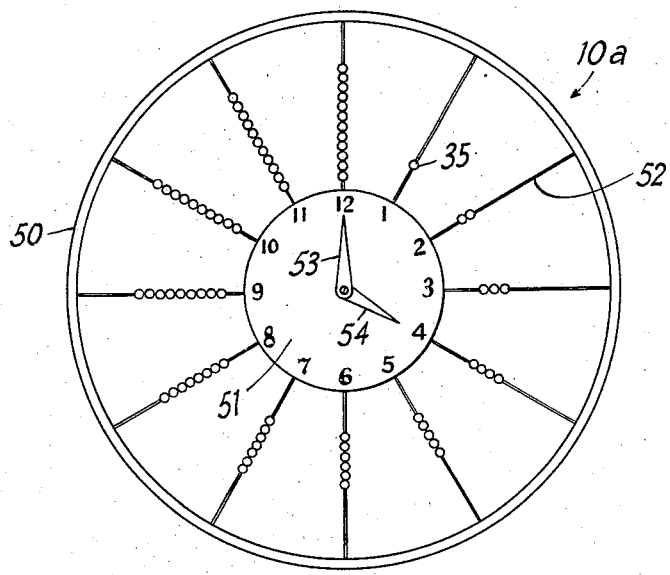
Fig. 4 is a top plan view of a modified form of the invention.

Referring now in detail to the drawings, 10 designates a device embodying the invention. The same comprises a rectangular frame 11 having parallel end members 12 interconnected by top and bottom parallel members 13. Interconnecting the end members 12 are seven parallel wires or other rail members designated by numerals 15, 16, 17, 18, 19, 20 and 21, respectively. The ends of the wires may be fixed to the end frame members 12 by any suitable means. The wires 15 to 21 are preferably equally spaced apart. The wires 15 and 21 are spaced from and parallel to the frame members 13.

Mounted on the wires 15 to 21 is a clock simulating member 25. Member 25 comprises a ring 26 covered at the front by a clock face simulating member 27. The wires 15 to 21 pass through drilled openings 28 in the ring 26. The face 27 contacts the front edge 29 of ring 26. Said clock face 27 may be made of paper, cardboard, parchment, wood, plastic material, sheet material, or any other suitable material.

On the clock face are printed or otherwise applied numbers "1" to "12," respectively, to indicate the hours of the day. Number "12" is disposed adjacent the top wire 15. Number "6" is disposed adjacent the bottom wire 21. Numbers "1" and "11" are disposed adjacent wire 16 but at opposite sides of the clock face. Numbers "2" and "10" are disposed adjacent wire 17 and at opposite sides of the clock face. Numbers "3" and "9" are disposed adjacent wire 18 and at opposite sides of the clock face. Numbers "4" and "8" are disposed adjacent wire 19 and at opposite sides of the clock face. Numbers "5" and "7" are disposed adjacent wire 20 and at opposite sides of the clock face.

Any suitable means may be provided to prevent sliding movement of the clock face on the wires. To this end, stop members 30 may be fixed to the wires adjacent the inner surfaces of the ring 26. On wire 15 are slidably mounted twelve beads or other objects 35, there being six beads on each side of the clock face. These beads have through openings and may be moved inwardly toward the clock face substantially in contact with the ring so that a child can count twelve beads to correspond with number "12" on the clock face, which designates 12 o'clock. On wire 16 there is slidably mounted a single bead 35 on the side of the clock face adjacent number "1." This bead indicates one o'clock. On the same wire but on the opposite side of the clock face are eleven beads which may be slidably moved toward numeral "11" on the clock face to indicate eleven o'clock. On wire 17 there are two beads on one side of the clock face and ten beads on the opposite side of the clock face. On wire 18 there are three beads on one side of the clock face and nine beads on the opposite side of the clock face. On wire 19 there are four beads on one side of the clock face and eight beads on the opposite side of the clock face. On wire 20 there are five beads on one side of the clock face and seven beads on the opposite side of the clock face. On wire 21 there are three beads on each side of the clock face. The six beads may be disposed toward the face near numeral "6" to indicate six o'clock.

It will now be noted that on each of the wires there are a number of beads corresponding to each numeral on the clock face adjacent the wire. Thus the child using the game will learn how to count and also how to tell time.

At the center of the clock face is a pivot pin or rivet 40. Rotatably mounted thereon is a minute simulating hand 41 and an hour simulating hand 42. The minute hand may also be moved to any desired position to indicate minutes.

The clock face may be decorated to represent a cat's face or any other amusing object. Adhered to the front of the clock face are a pair of ear simulating members 45 as shown in the drawings.

In Fig. 4 there is shown a device 10a embodying a modified form of the invention. The device 10a comprises a circular frame ring 50 and a central clock face 51 connected to the ring 50 by twelve radiating wires 52. The wires 52 are equiangularly spaced apart. On the clock face are the hour numerals each adjacent one of the wires. On the wires are slidably mounted beads 35. On the wires adjacent numeral "1" on the clock face, there is a single bead. On the wire adjacent numeral "2" on the clock face, are two beads, and so on, so that on the wire adjacent numeral "12" there are twelve beads.

On the clock face are also pivoted a minute hand 53 and an hour hand 54. If desired, the clock face may be suitably decorated.

It will thus be seen that there is provided a device in which the several objects of this invention are achieved, and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent:

1. A device of the character described, comprising a frame, a clock face simulating member marked with numerals to indicate the hours, wires interconnecting the clock face simulating member with the frame, and beads slidably mounted on said wires, the number of beads on each wire corresponding to the hour indicating numeral on the clock face adjacent said wire.

2. A device of the character described, comprising a frame having end portions and top and bottom portions, the end portions being interconnected by parallel wires, a clock face simulating member mounted on the wires and between said end portions, and beads slidably mounted on the wires, the number of beads on the wires corresponding to the hour numeral on the clock face adjacent the wires, respectively.

3. A device of the character described, comprising a circular frame, a clock face centrally located in the frame, radiating wires interconnecting the clock face frame, the clock face bearing numerals "1" to "12" in position to indicate the hours, there being one wire for each hour, beads slidably mounted on said wires, the number of beads on said wires corresponding to the hour numeral adjacent said wires, respectively.

4. An educational device of the character described, comprising a clock face, rail members emanating from the clock face, and objects slidably mounted on the rail members, the number of objects on each rail corresponding to the numeral indicating the hour on the clock face adjacent said rail.

5. A device of the character described, comprising a frame, a ring within the frame, a clock face simulating member on said ring, wires passing through the ring and connected to the frame and beads slidably mounted on said wires, the number of beads on said wires corresponding to the hour numeral adjacent said wires, respectively.

6. A device of the character described, comprising a frame, a ring within the frame, a clock face simulating member on said ring, wires passing through the ring and connected to the frame, and beads slidably mounted on said wires, the number of beads on said wires corresponding to the hour numeral adjacent said wires, respectively, a pivot at the center of the clock face simulating member, and a minute hand and an hour hand rotatably mounted on said pivot.

CHARLES C. COHEN.